(12) United States Patent
Adema (10) Patent No.: US 11,906,738 B2
(45) Date of Patent: Feb. 20, 2024

(54) SCANNING MEMS MIRROR ANGLE-DOUBLING USING POLARIZATION

(71) Applicant: GOOGLE LLC, Mountain View, CA (US)

(72) Inventor: Daniel Adema, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 239 days.

(21) Appl. No.: 17/204,457

(22) Filed: Mar. 17, 2021

(65) Prior Publication Data

US 2022/0299765 A1    Sep. 22, 2022

(51) Int. Cl.
| | |
|---|---|
| *G02B 26/10* | (2006.01) |
| *G02B 27/01* | (2006.01) |
| *G02B 5/30* | (2006.01) |
| *G02B 26/08* | (2006.01) |
| *G02B 27/28* | (2006.01) |
| *G02C 5/22* | (2006.01) |

(52) U.S. Cl.
CPC ....... *G02B 27/0172* (2013.01); *G02B 5/3083* (2013.01); *G02B 26/0833* (2013.01); *G02B 26/10* (2013.01); *G02B 27/283* (2013.01); *G02B 2027/0178* (2013.01); *G02C 5/22* (2013.01)

(58) Field of Classification Search
CPC .............. G02B 27/0172; G02B 5/3083; G02B 6/0833; G02B 6/10; G02B 27/283; G02B 2027/0178; G02C 5/22

USPC .......................................................... 359/198
See application file for complete search history.

(56) References Cited

U.S. PATENT DOCUMENTS

| | | | |
|---|---|---|---|
| 2010/0315477 A1* | 12/2010 | Shibayama | G02B 26/123 347/224 |
| 2012/0275002 A1* | 11/2012 | Nakao | H04N 9/3129 359/207.9 |
| 2022/0187601 A1* | 6/2022 | Morozov | G06F 3/011 |

OTHER PUBLICATIONS

Cheng, Z. et al., "Modeling and Optimal Design for a High Stability 2D Optoelectronic Angle Sensor", Sensors 2019, 19(20), Oct. 11, 2019; 13 pages.
Sigmakoki Co, Ltd., "Waveplate Application Note", accessed on Nov. 16, 2020 at <<https://www.global-bptosigma.com/en_jp/category/opt/opt07.html#:~:text=The%20light%20passes%20through%20the,passed%20through%20the%20quarter%20waveplate>>, 3 pages.

* cited by examiner

*Primary Examiner* — Joseph P Martinez
*Assistant Examiner* — Grant A Gagnon (57) ABSTRACT

Systems and methods for manipulation of the polarization state of light emitted by a laser projector to reduce the angle range of a scanning mirror articulated by a micro-electromechanical system MEMS to reduce power consumption are disclosed. A system includes a light source configured to emit laser light, a scanning mirror, and an angle expander disposed between the light source and the scanning mirror, the angle expander being configured to cause the laser light from the light source to be reflected at least once from the angle expander and at least twice from the scanning mirror.

19 Claims, 8 Drawing Sheets

SCANNING MEMS MIRROR ANGLE-DOUBLING USING POLARIZATION

BACKGROUND

A laser projector is an image display device that generally collimates laser light using specialized lenses and then scans the collimated laser light in a two-dimensional direction (horizontal direction and vertical direction) onto a projection surface to form an image or sequence of images. A conventional laser projector generally includes multiple laser light sources that each generate laser light of a specific wavelength in order to produce laser light beams of different colors, for example, red, green, and blue colored laser light. Further, in addition to the laser light sources, a conventional laser projector includes at least one scanning mirror, that scans laser light emitted from the laser light source in at least one direction. Articulation of the scanning mirror(s) may be accomplished by a micro-electromechanical system (MEMS) that moves the mirror(s) in response to actuation voltages provided by a power source associated with the laser projector.

Laser projectors can be incorporated into a variety of devices, including wearable heads-up displays (WHUDs) that are designed to be worn on the head of a user to generate images that are projected for viewing by a user via a waveguide, which is positioned in front of a user's eye. WHUDs are typically configured such that a user views the images on a transparent surface in front of their eye(s) to display, for example, augmented reality (AR) content, or such that a user views the images on an opaque surface that typically blocks light from the environment to create a virtual reality (VR) experience. In some cases, a WHUD includes a micro-display (e.g., a laser projector) to generate light representing images that are then conveyed to the waveguide, which transmits the light representing the images to a user's eye. In a WHUD that is designed to have the general shape and appearance of eyeglasses or goggles, the waveguide is typically implemented in the "lens" portion (which may be fully or partially transparent, or entirely opaque), while the micro-display and other components, such as a controller and power source (e.g., battery), are housed in the frame portion. Due to limited available space for components in the frame, and to ensure that the device is comfortable for a user to wear, it is typically desirable that the micro-display, battery, and other components be relatively small and light.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Devices, such as WHUDs, designed to be worn by a user to provide AR or VR experiences, are subject to a variety of design constraints that balance user comfort with device performance. As users have come to expect mobility in these types of devices, the devices' electronic components are typically powered by on-board batteries rather than external battery packs or plug-in power cords. Thus, the continuous operating time of a WHUD is typically limited by the amount of power available from the battery (or batteries) of the device. Because the space available for batteries and other components is limited in a conventional WHUD, efficient use of power by the device components increases operating times and provides for an enhanced user experience.

In a laser projector, not only is power is required to generate the laser light at the micro-display and to operate controlling components, but power is also required to articulate the scanning mirrors over a specified range of angles. In laser projectors with MEMS scanning mirrors, the power required to drive the mirror is proportional to the square of the maximum angle over the range of angles ($P=\theta^2$ where $\theta$ is the maximum angle over the specified range of angles over which the mirror can be articulated). Thus, reducing this maximum angle can provide significant power savings. However, the range of angles over which a scanning MEMS mirror of a laser projector operates correlates to the field of view (FOV) over which the projected images are displayed. Thus, there is a trade-off in a device employing a laser projector between conserving power by reducing the range of movement of a scanning mirror and maximizing the FOV by increasing the range of angles over which the mirror is articulated.

FIGS. 1-8 show systems and methods for manipulation of the polarization state of the laser light emitted by the laser diodes in a laser projector to reduce the angle range of a scanning MEMS mirror, and thus reduce power consumption, while still providing a wide range of angles over which light is output from the laser projector and thus supporting a relatively large FOV. That is, the techniques described herein support reducing the angle range of a scanning MEMS mirror with a relatively small impact on the FOV supported by the laser projector. For example, in some embodiments, the laser projector includes a polarization beam splitter (PBS) and a quarter-wave plate (QWP) between the laser light source and the scanning MEMS mirror of a laser projector system. Using this configuration, the angle at which the emitted laser light is reflected from the scanning MEMS mirror can be significantly increased (e.g., by 2X or more) compared to the initial angle of reflection. This increase is accomplished by causing the emitted laser light to be reflected at least twice from the scanning MEMS mirror before being transmitted out of the laser projector. In doing so, the second reflection of the laser light from the scanning MEMS mirror effectively doubles the initial angle of reflection.

Figure 1:
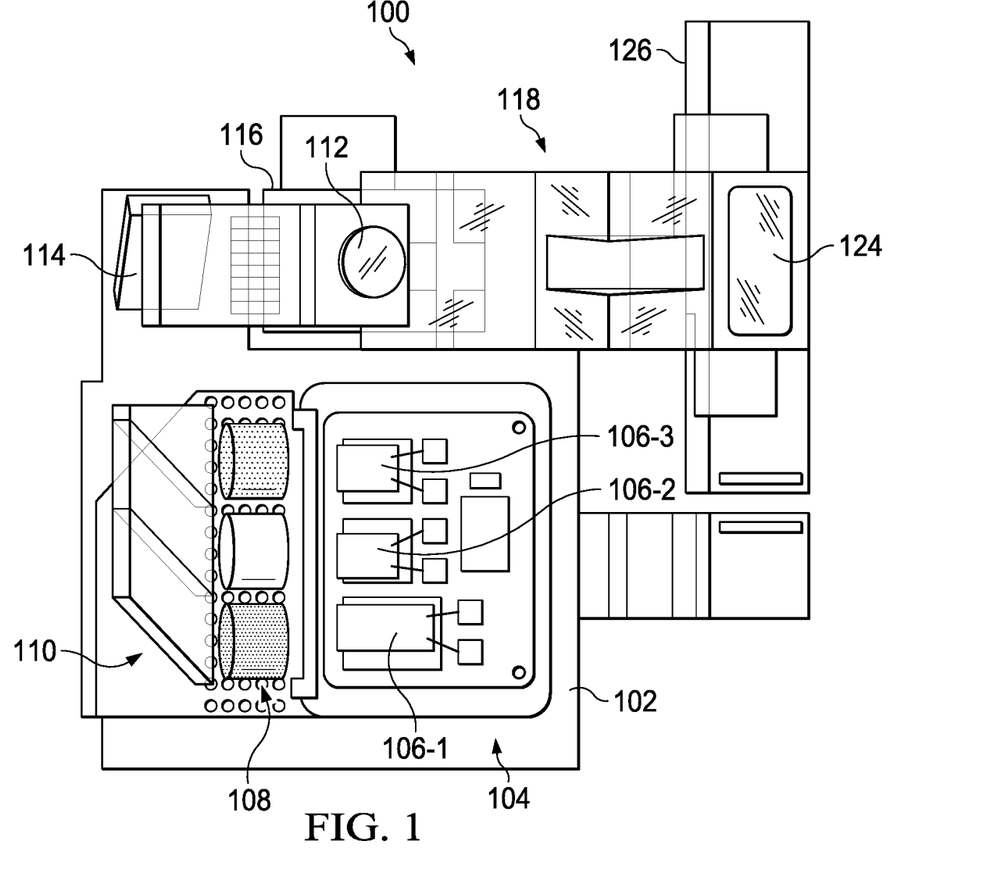
FIG. 1 shows an example embodiment of a laser projection system in accordance with some embodiments.

FIG. 1 shows an example embodiment of a laser projection system 100. As shown, the laser projection system 100 includes a substrate 102 on which an optical engine 104 is disposed. According to various embodiments, substrate 102 is a printed circuit board (PCB) or otherwise another applicable substrate. The optical engine 104 comprises a set of one or more laser light sources 106 (e.g., laser diodes), such as a red laser light source, green laser light source, and blue laser light source, wherein a processor or other controller operates the optical engine 104 to modulate the respective intensity of each laser light source 106 so as to provide a corresponding red light, green light, and blue light contribution to a corresponding pixel of an image being generated for display to the user. The primary lenses 108 includes a corresponding number of collimation lenses (e.g., three for the three laser light sources 106 in the example above), each interposed in the light path between a respective laser light source 106 of the optical engine 104 and the beam combiner 110. For example, each laser light source 106 outputs a different wavelength of laser light through the primary lenses 108 to be combined at the beam combiner 110 to produce the laser light (i.e., laser light 206 shown in FIG. 2) to be projected by the laser projection system 100. The beam combiner 110 receives the individual laser light inputs and outputs a combined laser light 206 to the mirror 114, which redirects the laser light 206 onto a reflective surface 112 of scanning mirror 116. Through articulation of the scanning mirror within a specified range of angles, the scanning mirror 116 scans the laser light 206 into the optical relay 118 across a first scanning axis.

In the example of FIG. 1, the optical relay 118 is a molded reflective relay, which may be, for example, molded from a solid clear component (e.g., glass or an optical plastic such as Zeonex) and the reflective surfaces thereof are implemented as mirror coatings or metasurfaces. Such molding can simplify fabrication of the laser projection system 100 as it facilitates the incorporation of some or all of the optical surfaces of the relay into a single element, rather than several distinct, separate elements. The optical relay 118 is configured to route laser light 206 toward a reflective surface 124 of scanning mirror 126. Scanning mirror 126 scans the laser light 206 along a second scanning axis that is perpendicular to the first scanning axis. In some embodiments, the laser light scanned by scanning mirror 126 is projected out of the laser projector system 100 to form an image or pattern in the air or on a surface. In some embodiments, the laser light scanned by the scanning mirror 126 is provided to an incoupler of a waveguide within a WHUD, such as WHUD 700 shown in FIG. 7, in order to transmit the laser light directly to a user's eye so as to create an augmented or virtual reality experience.

Figure 2:
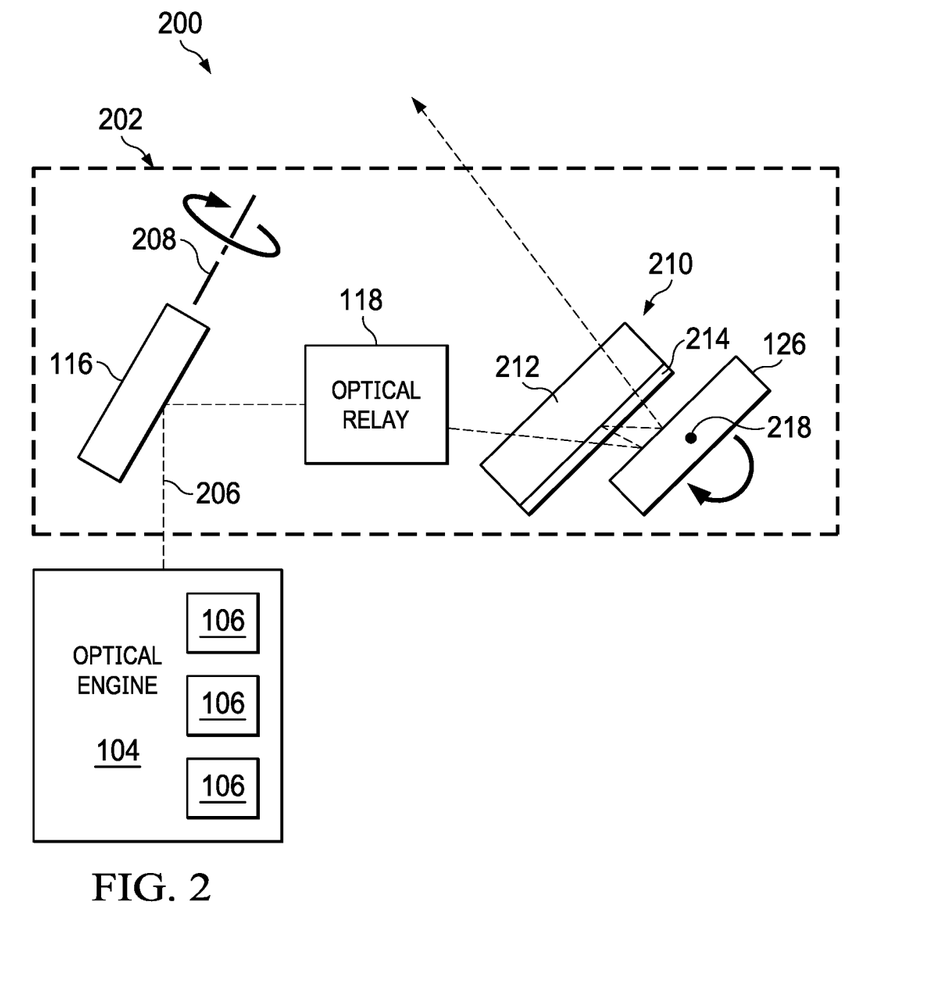
FIG. 2 shows a simplified block diagram of a portion of the laser projection system shown in FIG. 1 in accordance with some embodiments.

FIG. 2 illustrates a simplified block diagram of a laser projection system 200, such as laser projection system 100 shown in FIG. 1, including an angle expander 204. The laser projection system 100 includes an optical engine 104 and an optical scanner 202. The optical scanner 202 includes first scanning mirror 116, an angle expander 204, second scanning mirror 126, and optical relay 118. In some embodiments, laser projection system 200 is implemented in a WHUD or other display system, such as the WHUD 700 of FIG. 7.

The optical engine 104 includes one or more laser light sources 106 configured to generate and output laser light 206 (e.g., visible laser light such as red, blue, and green laser light and/or non-visible laser light such as infrared laser light). In some embodiments, the optical engine 104 is coupled to a driver or other controller (not shown), which controls the timing of emission of laser light from the laser light sources of the optical engine 104 in accordance with instructions received by the controller or driver from a computer processor coupled thereto to modulate the laser light 206 to be perceived as images when output to the retina of an eye of a user.

For example, during operation of the laser projection system 200, multiple laser light beams having respectively different wavelengths are output by laser light sources 106 of optical engine 104, then combined via a beam combiner (not shown), before being directed to the optical relay 118. The optical engine 104 modulates the respective intensities of the laser light beams so that the combined laser light reflects a series of pixels of an image, with the particular intensity of each laser light beam at any given point in time contributing to the amount of corresponding color content and brightness in the pixel being represented by the combined laser light at that time.

One or both of scanning mirrors 116 and 126 of the optical scanner 202 are MEMS mirrors in some embodiments. For example, scanning mirror 116 and scanning mirror 126 are MEMS mirrors that are driven by respective actuation voltages to oscillate during active operation of the laser projection system 100, causing scanning mirrors 116 and 126 to scan the laser light 206. Oscillation of scanning mirror 116 (i.e., the first scanning mirror) causes laser light 206 output by the optical engine 104 to be scanned through the optical relay 118 and across a surface of scanning mirror 126 (i.e., the second scanning mirror). The second scanning mirror 126 scans the laser light 206 received from the first scanning mirror 116 out of the laser projector system 100 by oscillating within a specified range of angles, where $\theta$ is the maximum angle in the specified range of angles over which the mirror can be articulated. In some embodiments, the scanning mirror 116 oscillates along a first scanning axis 208, such that the laser light 206 is scanned in only one dimension (i.e., in a line) across the surface of the second scanning mirror 126. In some embodiments, the scanning mirror 126 oscillates or otherwise rotates along a second scanning axis 218. In some embodiments, the first scanning axis 208 is perpendicular to the second scanning axis 218.

According to various embodiments, the optical relay 118 includes one or more collimation lenses that shape and focus the laser light 206 on the second scanning mirror 126 or includes a molded reflective relay, such as optical relay 118 shown in FIG. 1, that includes two or more spherical, aspheric, parabolic, and/or freeform lenses that shape and direct the laser light 206 onto the second scanning mirror 126, which scans the laser light 206 in a second dimension. Positioned between the optical relay 118 and the second scanning mirror 126 is an angle expander 210. The angle expander 210 is configured to cause the laser light 206 to reflect from the second scanning mirror 126 at least twice before the laser light 206 is directed out of the laser projector system 200. In some embodiments, the angle expander 210 is formed from a PBS 212 and a QWP 214. The PBS 212 is configured to transmit laser light having a first linear polarization state, such as P-polarized light, and to reflect laser light having a second linear polarization state, such as S-polarized light. The QWP 214 acts to convert laser light that is linearly polarized, such as either P-polarized laser light or S-polarized laser light, to laser light having circular polarization.

In some embodiments, the optical engine 104 includes at least one edge-emitting laser (EEL) light source that emits a laser light 206 having a substantially elliptical, non-circular cross-section, and the optical relay 118 magnifies or minimizes the laser light 206 along its semi-major or semi-minor axis to circularize the laser light 206 prior to convergence of the laser light 206 on the angle expander 210 and second scanning mirror 126. In some such embodiments, a surface of a mirror plate of the scanning mirror 126 is elliptical and non-circular (e.g., similar in shape and size to the cross-sectional area of the laser light 206). In other such embodiments, the surface of the mirror plate of the scanning mirror 126 is circular.

Although not shown in the example of FIG. 2, in some embodiments, additional optical components are included in any of the optical paths between the optical engine 202 and scanning mirror 116, between scanning mirror 116 and the optical relay 118, between the optical relay 118 and scanning mirror 126, and between scanning mirror 126 and the exit point of the optical path from the optical engine 202. Further, in some embodiments, scanning mirror 126 is encased in a vacuum-sealed enclosure or an enclosure containing a gas, such as nitrogen or a noble gas, in order to reduce the aerodynamic drag on the scanning mirror 126, thereby reducing the power required to articulate the scanning mirror 126. In some embodiments, the angle expander 210 is incorporated into the enclosure to act as a "window" such that light provided to the scanning mirror is first transmitted through the angle expander 210 as it enters the enclosure, and light reflected from the scanning mirror is transmitted through the angle expander 210 as it exits the enclosure.

Figure 3:
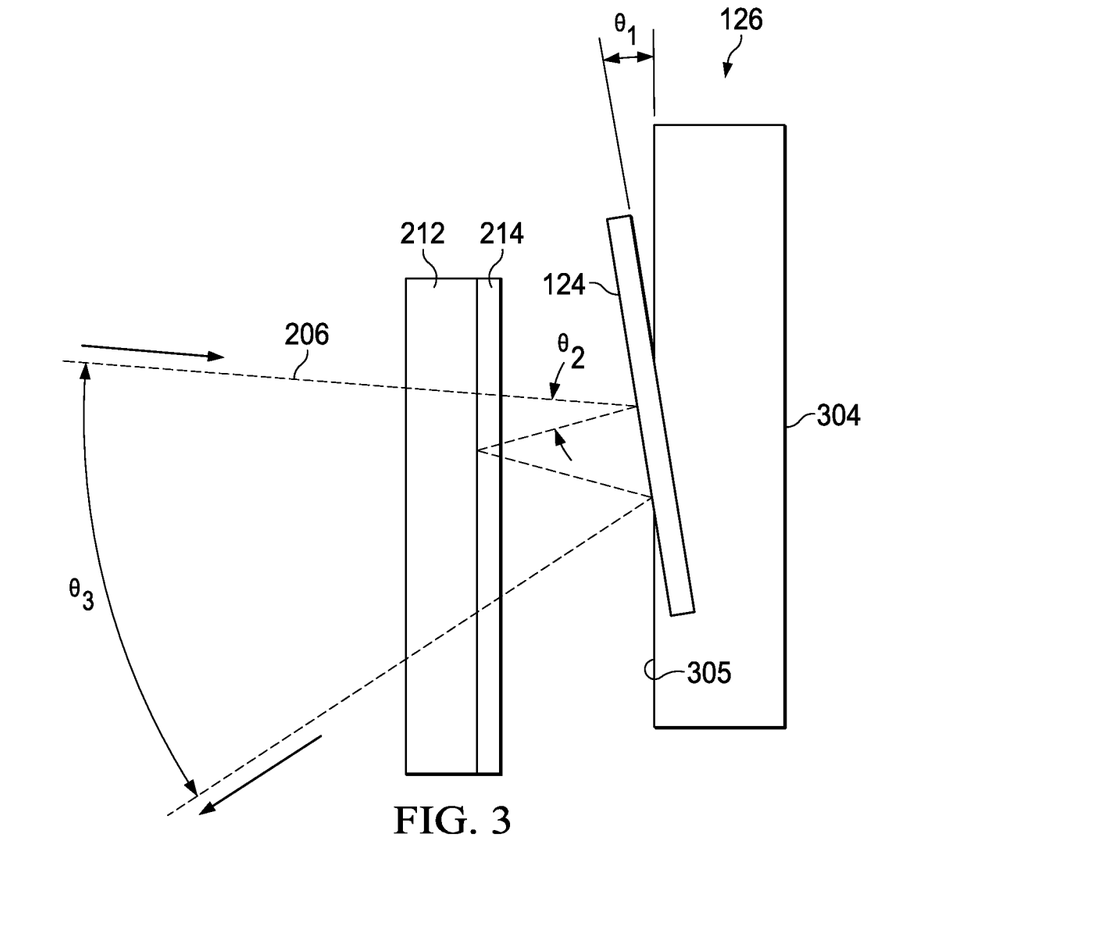
FIG. 3 shows a path of laser light emitted by an optical engine and directed by an angle expander and scanning mirror of a laser projector system, such as the laser projector system of FIG. 1 in accordance with some embodiments.

FIG. 3 illustrates a path of laser light 206 emitted by the optical engine 202 directed by the angle expander 210 and scanning mirror 126 of laser projector system 200 of FIG. 2. According to some embodiments, the scanning mirror 126 is composed of a reflective surface 124 mounted to an actuator device structure 304, including a surface 305 that faces the angle expander 210, which articulates the reflective surface along 124 at least one axis to position the reflective surface 124 at various angles relative to surface 305 of the actuator device structure 304. For example, the reflective surface 124 is shown in FIG. 3 as being articulated at an angle $\theta_1$ (e.g., 7.5 degrees) from surface 305 of the actuator device structure 304, which is positioned so as to be parallel to the surface of the angle expander 210 and perpendicular to the path of the incoming laser light 206. Thus, the angle at which the reflective surface 124 is positioned determines the angle at which the laser light 206 will be reflected from the reflective surface 124 relative to the path of the incoming laser light. In the present example, the laser light 206 that is first transmitted through the angle expander 210 to scanning mirror 126 will be reflected from the reflective surface 124 at an angle $\theta_2$ (e.g., 15 degrees) relative to the path of the incoming laser light 206. Due to changes in polarization imparted by the PBS 212 and QWP 214 of the angle expander 210, which will be described further below, the laser light 206 reflected from scanning mirror 126 is reflected from the PBS 212 to be incident on the scanning mirror 126 for a second time. The angle of reflection from the scanning mirror 126 for the second time relative to the path of the incoming laser light 206 is 03 (e.g., 30 degrees) which is double the angle of the first reflection $\theta_2$ from scanning mirror 126. Thus, without increasing the angle (i.e., $\theta_1$) at which the reflective surface 124 is positioned relative to the actuator device structure 304, which would come at a power cost to the laser projector system 200, the output angle of the reflected laser light is doubled. In other words, use of the angle expander 210 can achieve a range of output angles of ±30 degrees by articulating the reflective surface 124 of scanning mirror 126 over a range of ±7.5 degrees from the actuator device structure 304.

In a conventional laser projector system (i.e., a laser projector not employing an angle expander) the scanning mirror is articulated within a range of ±15 degrees (i.e., $\theta$) to achieve an output light path angle of ±30 degrees relative to the incoming light path. In the present example, an output light path angle of ±30 degrees is achieved by articulating scanning mirror 126 to a maximum angle of ±7.5 degrees. Because the power needed to articulate scanning mirror 126 is approximately equal to the square of the maximum angle to which the scanning mirror is articulated (i.e., $P=\theta^2$), reducing the maximum angle by half (i.e., $\theta_1=\theta *0.5$) reduces the power needed to articulate the scanning mirror by approximately three quarters. That is, $P_1/P=(\theta_1)^2/(\theta)^2= (0.5*\theta)^2/(\theta_1)^2=0.25$. Therefore, the power required to drive scanning mirror 126 in a laser projector system employing angle expander 210 is effectively a quarter of the power needed to achieve the same range of output angles in a laser projector system that does not have an angle expander.

Figure 4:
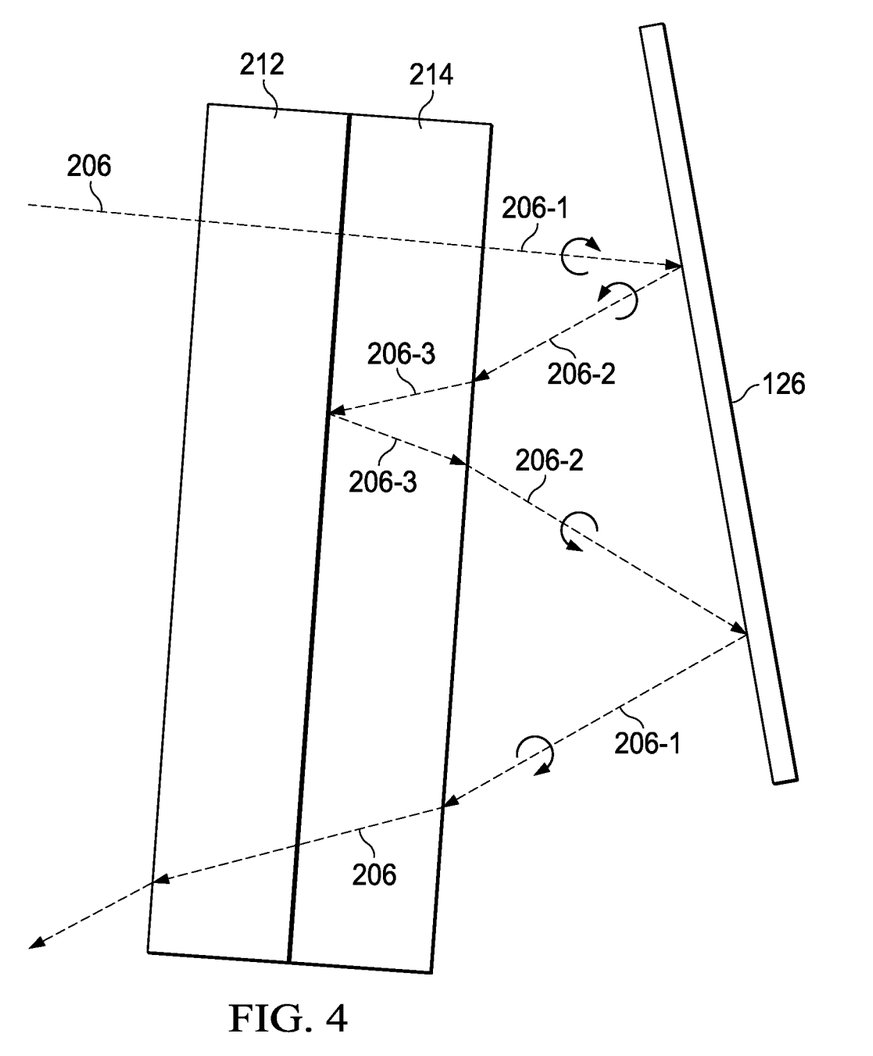
FIG. 4 shows the path of laser light in a laser projector, such as the laser projector of FIG. 1, illustrating the changes in polarization states imparted by the angle expander in accordance with some embodiments.

FIG. 4 shows the path of laser light 206 in a portion of laser projector system 200 illustrating the changes in polarization states imparted by the angle expander 210. Laser light 206, having a first linear polarization state (e.g., P-polarized) emitted from the laser light source 106 of the laser projector system 100, is transmitted to PBS 212, which is configured to transmit light having the first linear polarization state but reflect light having a second linear polarization state. Thus, because the laser light 206 is emitted having the first linear polarization state, it is transmitted through the PBS 212 to a QWP 214, where it is imparted with a first circular polarization (e.g., right-handed circular polarization) as it is transmitted through the QWP to the scanning mirror 126. The transmitted light having the first circular polarization 206-1 is reflected from scanning mirror 126 at a first angle that is proportional to the angle of the scanning mirror 126 back towards the QWP/PBS 212, 214. Additionally, on reflection from the scanning mirror 126, the laser light is converted to a second circular polarization state (e.g., left-handed circular polarization).

The laser light having the second circular polarization 206-2 is then converted to laser light having a second linear polarization state 206-3 as it is transmitted through the QWP 214 for a second time towards the PBS 212. Because the PBS 212 is configured to reflect light having the second linear polarization state, the laser light transmitted from the QWP 214 is reflected from the PBS back towards the scanning mirror 126. As the reflected light is transmitted through the QWP 214 it is converted to the second circular polarization state. On incident with scanning mirror 126 for a second time, the light having the second circular polarization state 206-3 is converted to the first circular polarization state as it is reflected. The reflected light having the first circular polarization state 206-1 is then transmitted through the QWP 214 and converted to the first linear polarization state. Because the PBS 212 is configured to transmit light having the first linear polarization state, the laser light 206 having the first linear polarization state is transmitted through the PBS 212. The transmitted laser light may then be further manipulated by other components or exit the laser projector system 100.

While the angle expander 210 and its effects on laser light are described here in the context of a laser projector system, the angle expander 210 can also be used in other light projector systems, such as a digital light processing (DLP) projectors. Similar to the laser projector system 200, conventional DLP projectors also rely on reflection of light from at least one articulated mirror to form images for projection. However, degradation of the projected image quality can be caused due to the presence of a high contrast, high spatial frequency, granular pattern that seems to float in front of the projected image plane. This pattern is referred to as "speckle". An angle expander, such as angle expander 210, can be placed between the light source and an articulated mirror (or array of articulated mirrors) of a DLP projector to condition the light source prior to reflection from the articulated mirror in order to reduce speckle.

In some embodiments, a portion of the laser light 206 is reflected from the surfaces of the angle expander 210 creating stray laser light. When the path of the stray laser light reflected from a surface of the angle expander 210 is parallel to the path of the laser light output from the angle expander 210, it appears as what is known as a "ghost reflection". The ghost reflection(s) may appear to a user or observer as a dim and slightly out-of-focus image offset from the primary projected image or it can create chromatic aberrations in the projected image, which can interfere with the user experience.

Figure 5:
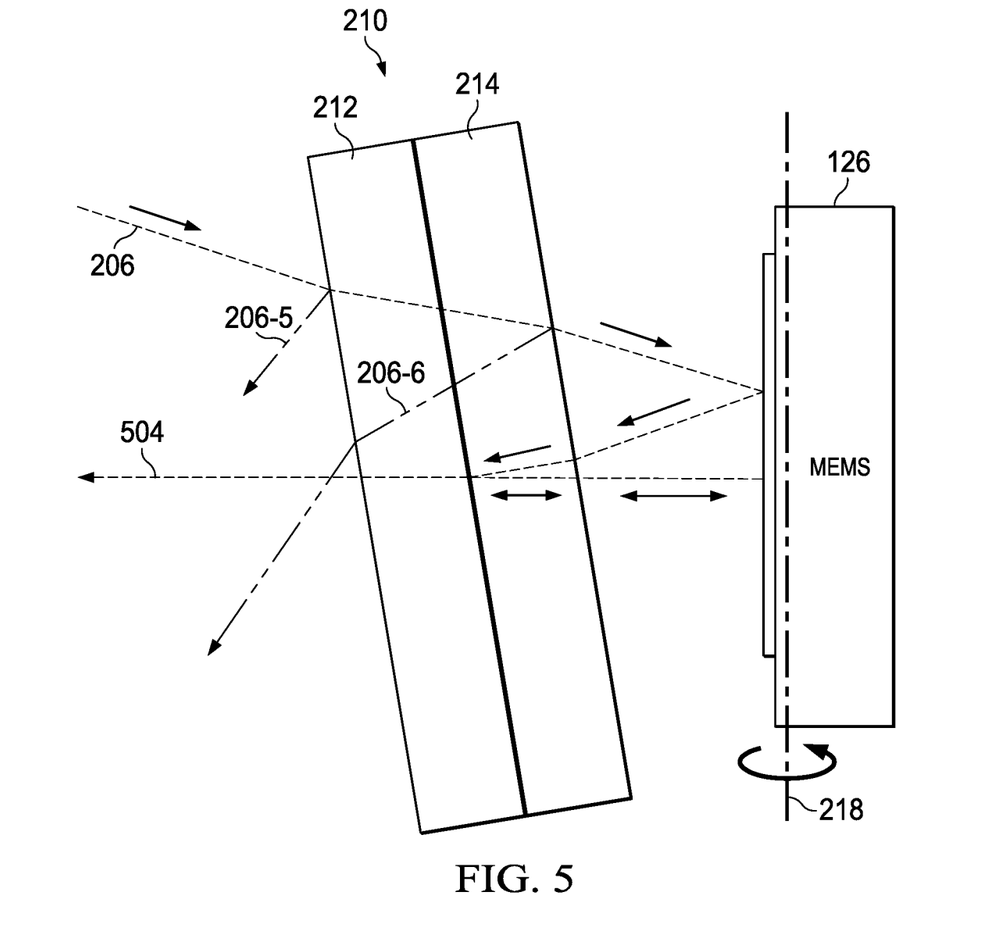
FIG. 5 illustrates an angle expander positioned at a non-zero angle relative to the rotational axis of the scanning mirror in a laser projector system, such as the laser projector system of FIG. 1, in accordance with some embodiments.

FIG. 5 illustrates an angle expander 210 positioned at a non-zero angle relative to the rotational axis of the scanning mirror 126 in a laser projector system, such as laser projector system 200 of FIG. 2, in order to reduce ghost reflections from the laser projector system 200. By tilting the angle expander 210 away from parallel with the rotational axis 218 of scanning mirror 126, the portions of laser light that are reflected from the surfaces of the angle expander 210 (i.e., ghost reflections 206-5) are reflected at non-parallel angles to the output laser light path 504, thus directing ghost reflections 206-5 away from the path of the laser light output 504 from the system 200. For example, as laser light 206 from the optical engine is incident on the PBS 212 of the angle expander 210 most of the laser light 206 is transmitted into the PBS while a relatively small portion of the laser light 206-5 is reflected at a non-parallel angle to that of the laser light 206 that is output from the angle expander 210 after reflection by scanning mirror 126. As the laser light transmitted into the PBS 212 encounters the boundary of QWP 214 of the angle expander 210, another portion of the laser light 206-6 is reflected and exits the angle expander 210 at an angle that is non-parallel to the output path 504 of the laser light 206 output from the angle expander 210 after reflection by scanning mirror 126. According to some embodiments in which laser projector system 200 is employed as part of a WHUD, the ghost reflection(s) are directed to feature(s) designed to absorb light (i.e., a "light sink", not shown) or specifically directed out of the WHUD to avoid further reflection and potential interference with the light output from the laser projector system 100.

In some embodiments, components of the laser projector system 200 are configured to provide linearly polarized (e.g., P-polarized) laser light 206 to the angle expander 210 at a specific angle, known as Brewster's angle, in order to prevent ghost reflections. Polarized laser light 206 incident on PBS 212 of the angle expander 210 at Brewster's angle is transmitted at approximately 100% efficiency. Thus, no ghost reflection of the polarized light 206 occurs at Brewster's angle, effectively eliminating stray light resulting from partial reflections of the laser light 206 at the surfaces of the angle expander 210. Further, in some embodiments, the material(s) from which the angle expander 210 is formed, along with the specific tilt angle of the angle expander 210 with respect to the axis of rotation 218 of scanning mirror 126, is configured so that the light that is output from the scanning mirror 126 is perpendicular to the rotational axis 218 of scanning mirror 126 in order to maximize use of the entire reflective surface 124.

Figure 6:
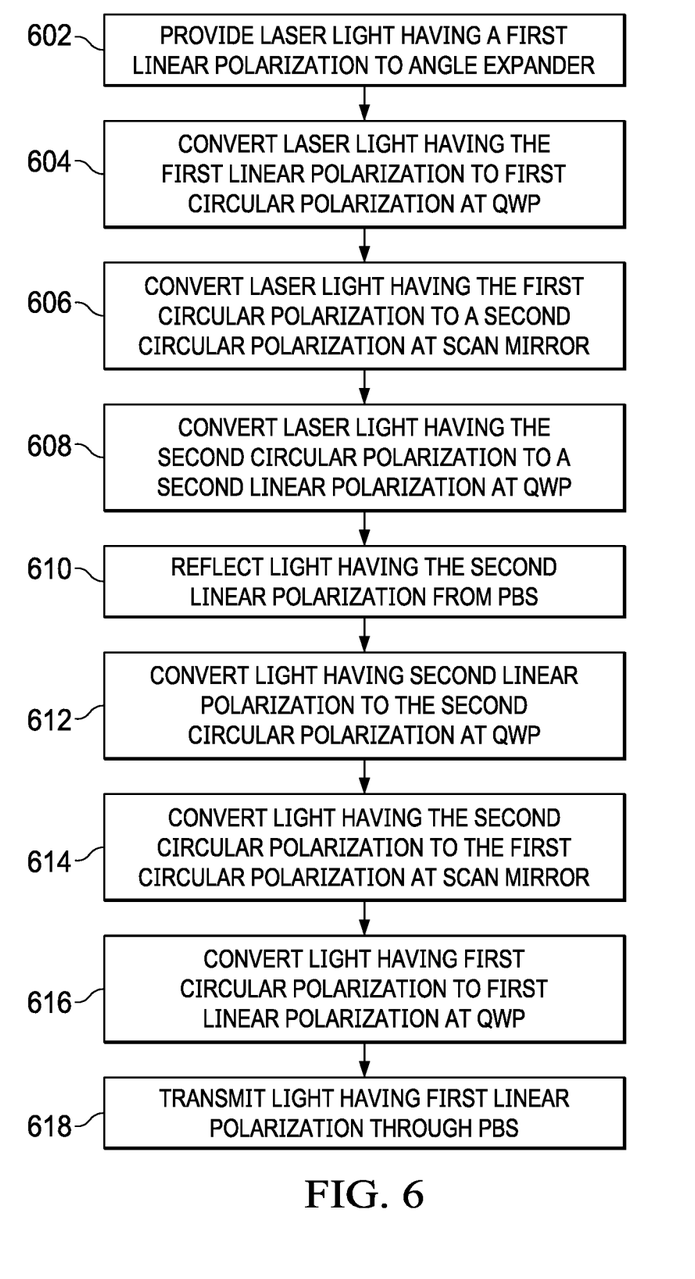
FIG. 6 illustrates a method of increasing an output angle of a scanning MEMS mirror in a laser projector system, such the scanning mirror in laser projector system of FIG. 1, in accordance with some embodiments.

FIG. 6 illustrates a method of increasing an output angle of a scanning MEMS mirror in a laser projector system, such as scanning mirror 126 and laser projector system 100 of FIG. 1. Laser light 206 having a first linear polarization is output from the optical engine and provided to the angle expander 210 at block 602. The laser light 206 is then transmitted through PBS 212 and QWP 214 of the angle expander 210, where it is converted to laser light having a first circular polarization 206-1 at block 604. The laser light having the first circular polarization 206-1 is reflected from scanning mirror 126 and converted to laser light having the second circular polarization 206-2 at block 606, which is then transmitted through the QWP 214 where it is converted to laser light having the second linear polarization 206-3, at block 608. The laser light having the second linear polarization 206-3 is reflected from the PBS 212, at block 610, and converted to laser light having the second circular polarization 206-2 as it is transmitted through QWP 214 towards scanning mirror 126, at block 612. On incident with scanning mirror 126, at block 614, the laser light having the second circular polarization 206-2 is converted to laser light having the first circular polarization 206-1. At block 616, the laser light having the first circular polarization 206-1 is converted to laser light 206 having the first linear polarization at QWP 214. Because PBS 212 is configured to transmit light having the first linear polarization, at block 618, the laser light 206 is transmitted through PBS 212 to be further acted upon by other components or to be output from the laser light projector system 100.

Figure 7:
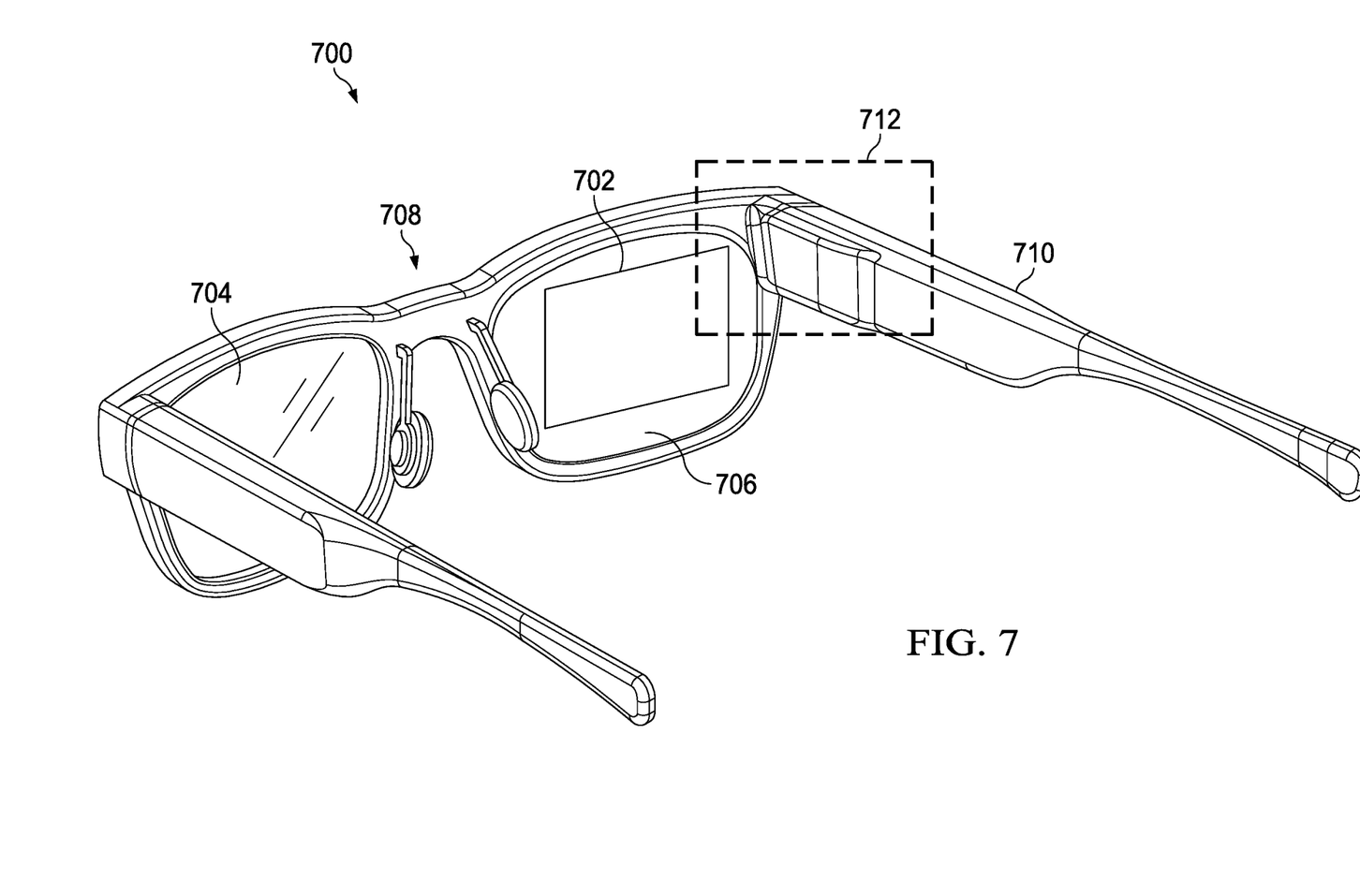
FIG. 7 shows an example WHUD in which a laser projector system, such as the laser projection system of FIG. 1, including an angle expander can be employed in accordance with some embodiments.

FIG. 7 illustrates an example WHUD 700 in which a laser projector system, such as laser projection system 200 of FIG. 2, can be utilized. The WHUD 700 is configured to project images toward the eye of a user, such that the user perceives the projected images as being displayed in a FOV area 702 at one or both of lens elements 704, 706. In the depicted embodiment, the WHUD includes a support structure 708 configured to be worn on the head of a user and has a general shape and appearance of eyeglass frames (e.g., sunglasses). The support structure 708 contains or otherwise includes various components to facilitate the projection of such images toward the eye of the user, such as the laser projector, optical scanner, and a waveguide. In some embodiments, the support structure 708 further includes various sensors, such as one or more front-facing cameras, rear-facing cameras, other light sensors, motion sensors, accelerometers, and the like. The support structure 708 further can include one or more radio frequency (RF) interfaces or other wireless interfaces, such as a Bluetooth™ interface, a WiFi interface, and the like. Further, in some embodiments, the support structure 708 includes one or more batteries or other portable power sources for supplying power to the electrical components of the WHUD 700. In some embodiments, some or all of these components of the WHUD 700 are fully or partially contained within an inner volume of support structure 708, such as within the arm 710 in region 712 of the support structure 708. It should be noted that while an example form factor is depicted, it will be appreciated that in other embodiments the WHUD 700 may have a different shape and appearance from the eyeglasses frame depicted in FIG. 7.

One or both of the lens elements 704, 706 are used by the WHUD 700 to provide an augmented reality (AR) display in which rendered graphical content can be superimposed over or otherwise provided in conjunction with a real-world view as perceived by the user through the lens elements 704, 706. For example, laser light used to form a perceptible image or series of images is projected by a laser projector system of the WHUD 700, such as laser projector system 100 of FIG. 1, onto the eye of the user via a series of optical elements, such as a waveguide formed at least partially in the corresponding lens element, one or more scanning mirrors, such as scanning mirrors 116 and 126, and one or more optical relays, such as optical relay 118. One or both of the lens elements 704, 706 thus include at least a portion of a waveguide that routes display light received by an incoupler of the waveguide to an outcoupler of the waveguide, which outputs the display light toward an eye of a user of the WHUD 700. The display light is modulated and scanned onto the eye of the user such that the user perceives the display light as an image. In addition, each of the lens elements 704, 706 is sufficiently transparent to allow a user to see through the lens elements to provide a field of view of the user's real-world environment such that the image appears superimposed over at least a portion of the real-world environment.

In some embodiments, the laser projector system 100 is communicatively coupled to a controller (not shown) and a non-transitory processor-readable storage medium or memory storing processor-executable instructions and other data that, when executed by the controller, cause the controller to control the operation of the projector. In some embodiments, the controller controls a scan area size and scan area location for the laser projector and is communicatively coupled to a processor (not shown) that generates content to be displayed at the WHUD 700. The laser projector system 100 scans light over a variable area, designated the FOV area 702, of the WHUD 700. The scan area size corresponds to the size of the FOV area 702 and the scan area location corresponds to a region of one of the lens elements 704, 706 at which the FOV area 702 is visible to the user. Generally, it is desirable that a display have a wide FOV to accommodate the outcoupling of light across a wide range of angles. Herein, the range of different user eye positions that will be able to see the display is referred to as the eyebox of the display. In some embodiments, at least a portion of an outcoupler of the waveguide may overlap the FOV area 702, as described below with reference to FIG. 8.

Figure 8:
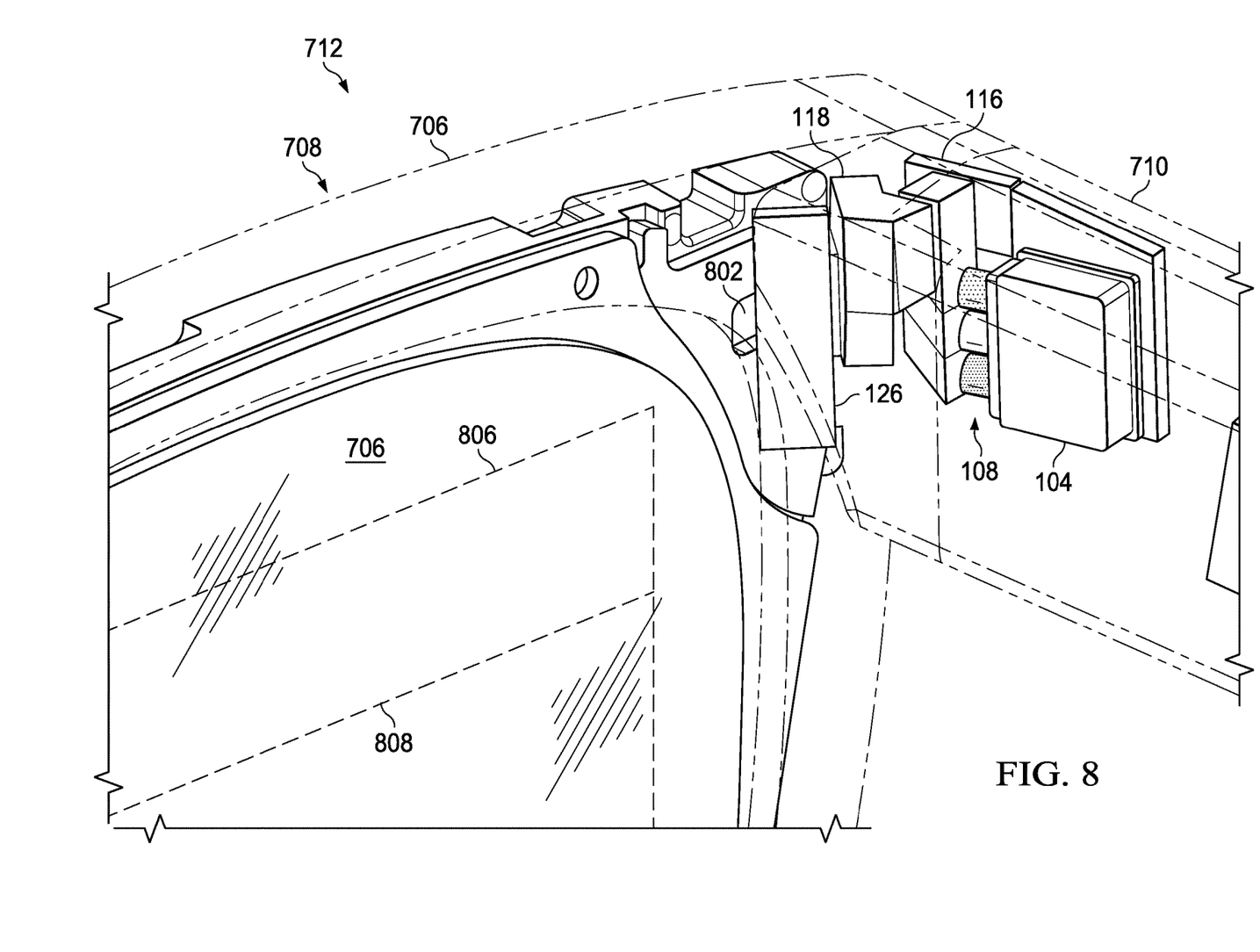
FIG. 8 shows a perspective, partially transparent view of a portion of a WHUD, for example, the WHUD of FIG. 7, in accordance with some embodiments.

FIG. 8 shows a perspective, partially transparent view of a portion of a WHUD, for example, the WHUD corresponds to the WHUD 700 of FIG. 7, and the illustrated portion of the WHUD 700 corresponds to the region 712 shown in FIG. 7. The WHUD 700 includes an example arrangement of the laser projection system 100 of FIGS. 1 and 2 for an embodiment in which the optical relay 118 is a molded reflective relay.

The arm 710 of the WHUD 700 houses the optical engine 104, the primary lenses 108, at least a portion of the first scanning mirror 116, the optical relay 118, and the substrate 102. Support structure 708 of the WHUD 700 houses the second scanning mirror 126, portions of the first scanning mirror 116, and optical relay 118. An incoupler 802 and an outcoupler 808 of the waveguide 806, are each embedded in or otherwise disposed on the lens 706. As described above, laser light 206 output by the optical engine 104 is routed to the incoupler 802 via at least the first scanning mirror 116, the optical relay 118, and the second scanning mirror 126. The first scanning mirror 116 oscillates or otherwise rotates to scan the laser light 206 along a first scanning axis, and the second scanning mirror 126 oscillates or otherwise rotates to scan the laser light 206 along a second scanning axis that is perpendicular to the first scanning axis. Laser light 206 reflected by the second scanning mirror 126 converges to a line at the incoupler 802. Laser light 206 received at the incoupler 802 is routed to the outcoupler 808 via the waveguide 806. The light received at the outcoupler 808 is then directed out of the waveguide 806 (e.g., toward the eye of a user of the WHUD 700).

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
a light source configured to emit laser light;
a scanning mirror; and
an angle expander disposed between the light source and the scanning mirror, wherein the angle expander is configured to cause the laser light from the light source to be reflected at least once from the angle expander and at least twice from the scanning mirror.

2. The apparatus of claim 1, wherein the angle expander comprises;
a polarization beam splitter (PBS); and
a quarter-wave plate (QWP).

3. The apparatus of claim 2, wherein the PBS is configured to reflect laser light having a first polarization and to transmit laser light having a second polarization.

4. The apparatus of claim 3, wherein the light source is configured to emit laser light having the first polarization.

5. The apparatus of claim 1, wherein the scanning mirror is a micro-electromechanical system (MEMS) based scanning mirror.

6. The apparatus of claim 1, wherein the angle expander is positioned at a non-zero angle relative to a rotational axis of the scanning mirror.

7. The apparatus of claim 1, wherein the scanning mirror is enclosed in a vacuum-sealed enclosure and wherein the angle expander is configured as a window of the vacuum-sealed enclosure.

8. The apparatus of claim 1, wherein the apparatus is a wearable heads-up display (WHUD).

9. A method comprising:
emitting, from a laser light source, laser light having a first linear polarization towards an angle expander;
transmitting the laser light having the first linear polarization through the angle expander disposed between the laser light source and a scanning mirror, the angle expander comprising a polarization beam splitter (PBS) and a quarter-wave plate (QWP), wherein the QWP is disposed between the PBS and scanning mirror;
reflecting for a first time, at the scanning mirror, laser light transmitted from the angle expander;
reflecting, at the PBS, the laser light reflected from the scanning mirror;
reflecting for a second time from the scanning mirror, the laser light reflected from the PBS; and
transmitting, through the PBS, the laser light reflected from the scanning mirror.

10. The method of claim 9, wherein the PBS is configured to transmit laser light having a first linear polarization and to reflect laser light having a second linear polarization.

11. The method of claim 10, further comprising:
converting the laser light reflected for the first time from the scanning mirror to laser light having the second linear polarization on incident with the QWP.

12. The method of claim 10, further comprising:
converting the laser light reflected for the second time from the scanning mirror to laser light having the first linear polarization on incident with the QWP.

13. A laser projector system comprising:
an optical engine configured to emit laser light along a path;
a scanning mirror configured to reflect the laser light;
a polarization beam splitter (PBS), disposed in the path of the laser light between the optical engine and the scanning mirror, the PBS being configured to selectively reflect laser light based on a polarization state of the laser light; and
a quarter-wave plate (QWP), disposed in the path of the laser light between the scanning mirror and the PBS, wherein the PBS is positioned at a non-zero angle relative to a rotational axis of the scanning mirror.

14. The laser projector system of claim 13, wherein the optical engine is configured to emit laser light having a first polarization state.

15. The laser projector system of claim 14, wherein the PBS is configured to transmit laser light having the first polarization state and to reflect light having a second polarization state.

16. The laser projector system of claim 15, wherein the scanning mirror is a micro-electromechanical system (MEMS) based scanning mirror.

17. The laser projector system of claim 13, wherein the scanning mirror is enclosed in a vacuum-sealed enclosure and wherein the PBS is configured as a window of the vacuum-sealed enclosure.

18. The laser projector system of claim 13, wherein the scanning mirror is enclosed in a vacuum-sealed enclosure and wherein the PBS is configured as a window of the vacuum-sealed enclosure.

19. The laser projector system of claim 13, wherein the scanning mirror is enclosed in an enclosure filled with at least one of a noble gas and nitrogen, wherein the PBS is configured as a window of the enclosure.

* * * * *